United States Patent
Cocherl et al.

(10) Patent No.: US 7,570,749 B1
(45) Date of Patent: Aug. 4, 2009

(54) METHOD AND SYSTEM FOR DETERMINING A LEAST COST PATH FOR ROUTING INTERNATIONAL COMMUNICATIONS TRAFFIC

(75) Inventors: Terry Lee Cocherl, Olathe, KS (US); Gregory Alan Mordini, Highlands Ranch, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/947,495

(22) Filed: Nov. 29, 2007

Related U.S. Application Data

(63) Continuation of application No. 10/425,926, filed on Apr. 29, 2003, now Pat. No. 7,352,852.

(51) Int. Cl.
*H04M 15/00* (2006.01)

(52) U.S. Cl. .................. 379/114.02; 379/1.04; 379/12; 379/22; 379/115.01; 379/121.01; 379/221.01

(58) Field of Classification Search ............... 379/1.01, 379/9, 14.01, 10.01, 12, 15.01, 16, 22, 114.02, 379/114.06, 114.07, 114.08, 121.01, 1.04, 379/115.01, 221.01
See application file for complete search history.

(56) References Cited

U.S. PATENT DOCUMENTS

| | | | | |
|---|---|---|---|---|
| 4,464,543 A * | 8/1984 | Kline et al. | .................. | 379/224 |
| 5,490,199 A * | 2/1996 | Fuller et al. | ................. | 379/1.04 |
| 5,917,898 A * | 6/1999 | Bassa et al. | .................. | 379/133 |
| 6,373,929 B1 | 4/2002 | Johnson | | |
| 6,487,283 B2 | 11/2002 | Thomas | | |
| 6,718,029 B1 * | 4/2004 | Zey | ........................ | 379/221.02 |
| 7,050,555 B2 | 5/2006 | Zargham | | |
| 7,050,813 B1 * | 5/2006 | Paiz | ............................ | 455/446 |
| 7,289,489 B1 * | 10/2007 | Kung et al. | .................. | 370/352 |
| 2006/0092926 A1 * | 5/2006 | Tang et al. | ................... | 370/352 |

* cited by examiner

*Primary Examiner*—Binh K Tieu

(57) ABSTRACT

A method, system, and medium for determining a least-cost, international-routing path to communicate data across a telecommunications network are provided. The path implementation variables can be presented on a user interface or used to automatically generate a switch update transaction that implements the path. The method includes identifying variables that affect the determination of a least-cost path, receiving data values that correspond to the variables, and presenting the data values so that the path can be determined in response to observing the variables. Confidence and route testing can be conducted using the present invention.

15 Claims, 8 Drawing Sheets

Excalibur Configuration Summary

Configuration: IDDD for INDIA
As Of WO Nbr: 19818
Generated By: Terry Cocherl
Generated On: 12/20/2002 3:08:36 PM Configuration Details:

SWITCH 093

CITY CODES (BANGALORE):
   80

MIN/MAX:
   9/12

Outbound
      ALLOCATIONS:
      25%  C & W - RESALE
      25%  BELLSOUTH LD
      25%  PRIMUS - RESALE
      25%  TELIA ROUTING:
      25%  C & W - RESALE
      W800  C & W - RESALE
      W696  C & W - RESALE
      W780  TELIA
      W660  PRIMUS - RESALE
      W801  BELLSOUTH LD
      W843  IDT - RESALE
      W665  SONERA
      W794  TELSTRA
      W900  SWISSCOM -

RESALE
TELESONIC LTD    FTW1539    BHARTI

Excalibur Work Order Summary

WO Nbr: 19818
Ref WO Nbr: 18911
Configuration: IDDD for INDIA
Generated By: Terry Cocherl
Generated On: 12/20/2002 3:06:29 PM Work Queue: ITRNS
Requested On: 12/11/2002 3:00:43 PM
Requested By: Scott Crooks
Priority: 9
Updated On: 12/18/2002 2:15:33 PM
Updated By: Scott Crooks
Country: INDIA
Country Code: 91
Product: IDDD
Service Type: City Code Change Description of Changes:

SWITCH 093

BANGALORE

1. Min/Max Values
         Unchanged

2. Add City Codes
         None

3. Move City Codes

FIG. 4

METHOD AND SYSTEM FOR DETERMINING A LEAST COST PATH FOR ROUTING INTERNATIONAL COMMUNICATIONS TRAFFIC

CROSS REFERENCE TO RELATED APPLICATIONS

This application is a Continuation of prior application Ser. No. 10/425,926, filed Apr. 29, 2003, and having attorney docket no. 2144/SPRI.101539, and which is incorporated by reference herein.

TECHNICAL FIELD

This invention relates to the field of telecommunications. More particularly, the present invention provides a new and useful method for efficiently and economically implementing international routing, inclusive of cost and network elements.

BACKGROUND OF THE INVENTION

In a telecommunications setting, "routing" refers to at least defining a network configuration through a workflow process. Due to the competitive global market, establishing international routes to communicate traffic is a complex process absent the present invention.

When few variables were needed to be taken into consideration to route international traffic, various prior-art methods were used. One such method employed text-based email. Routes are implemented based on information that is entered into and contained within switch routing tables. A switch contains many data tables, establishes numerous routes, and manages the flow of traffic to and from international countries. In this prior-art method, a person referred to as a "planner" would retrieve data related to establishing an international route. With only very few variables to consider, the planner would determine a network configuration and send an email to a "switch translations analyst" who would implement the change in the appropriate switch. This system and method is limited to environments where very few variables need to be considered. Moreover, this prior-art method is prone to errors because it uses a crude text based email system. It is impossible to deliver meaningful analysis from crude text based data. Switch commands sent by a planner could be erroneously entered, thus leaving greater room for error.

The switch translations analyst does not have access to the data available to planners. Accordingly, the switch translations analyst may have no way of knowing that the planner's instructions are erroneous. Invalid commands in the switch would disrupt communications between customers and its services. A slightly better system method can be found in a simple database prior-art system.

The simple database architecture provided a central repository for text-based instructions that were formerly communicated via email. Even in this prior-art system, a planner must gather from a variety of sources the data necessary to formulate the routing instructions for a switch translations analyst to update the switch. Gathering the information to determine what routing scenario is the most economical becomes even more cumbersome as additional variables must be considered.

A final exemplary prior-art system used to determine the least-cost pathway to route international traffic involves a strained collaboration between at least three parties. Such a collaborative system involves a first group who negotiates the cost of service associated with the use of minutes of international bandwidth. A second group receives instructions from the first group and then pieces other network and data variables together in an attempt to communicate the appropriate least-cost routing path to the translations department. Such a structure is not adequate to support changing business requirements and lacks a solid architecture and database structure upon which to build additional functionality.

This prior-art system still captures work orders as freeform text. A still more significant, albeit common, shortcoming of this prior-art system is that no one entity has all the information needed to both negotiate buying international call time and to determine network elements for the international route. That is, the negotiations group is often unaware of the actual bandwidth needs of the carrier or the network details and the network analyst, who determines the network configuration, is unaware of what is available to purchase.

The reason for this disconnect is that the prior art does not offer a system that receives all the variables necessary to determine a least-cost route and present those variables on a single user interface so that a routing request can be determined. The current state of the art could be improved by providing such a system. Moreover, the art could be improved by providing a system that incorporates a rules engine to automatically construct a switch update and automatically send it to the switch(s) necessary to implement the routing request.

SUMMARY OF THE INVENTION

The present invention solves at least the above problems by providing a system and method for determining least-cost routing that receives all the variables necessary to make the determination and presents them on a single user interface. The present invention is a database-centered application for determining and implementing the most economical call routing path from a set of inputs. The present invention has several practical applications in the technical arts including providing resourceful management of nondirect routing opportunities, identification of routing opportunities, communication with carriers, implementation of routing for new carriers and/or new locations, routing to existing carriers, and quality assurance of resourceful routes including their dial plan information.

In one aspect of the invention, a system is implemented in a telecommunications-networking environment and includes a data-receiving component. The data-receiving component receives all of the data values that affect the determination of the routing path. A memory is included for storing the data values. Finally, a user interface presents the data values on a display device. A user observing the user interface can more easily, accurately, and efficiently determine a routing path based on the variables.

In another aspect of the invention, a method for determining the least expensive path to route international communications is provided. The method includes identifying the variables that affect determining the least-cost route, receiving the data values that correspond to the variables, and presenting the plurality of data values on a single user interface.

In another aspect of the invention, a method is provided for ensuring that no overlap exists with dialed digits. Each dial plan is linked to a core database to ensure accuracy and quality of service.

Although the present invention is defined by the provided claims, it satisfies several objects. A nonexhaustive list of objects of the present invention include: to better manage nondirect routing opportunities; to better identify routing opportunities; to improve communications with other carriers; to reduce time required to implement routing for a new carrier; to reduce time required to route to an existing carrier; and/or to improve ongoing quality assurance of routes.

BRIEF DESCRIPTION OF THE SEVERAL VIEWS OF THE DRAWINGS

The present invention is described in detail below with reference to the attached drawing figures, wherein:

FIG. 2 is a first screen shot of the present invention depicting a first exemplary function of the present invention: building International Direct Distance Dialing (IDDD) routing including the cost of service, specific switch termination, allocation, and city code data;

FIG. 3 is a second screen shot of the present invention having a split screen depicting a second exemplary function of the present invention: presenting a configuration summary and a work order change summary relating to switch-translations changes;

FIG. 4 is a third screen shot of the present invention depicting a third exemplary function of the present invention: presenting a historical log of open and closed work orders;

DETAILED DESCRIPTION OF THE INVENTION

Figure 1:
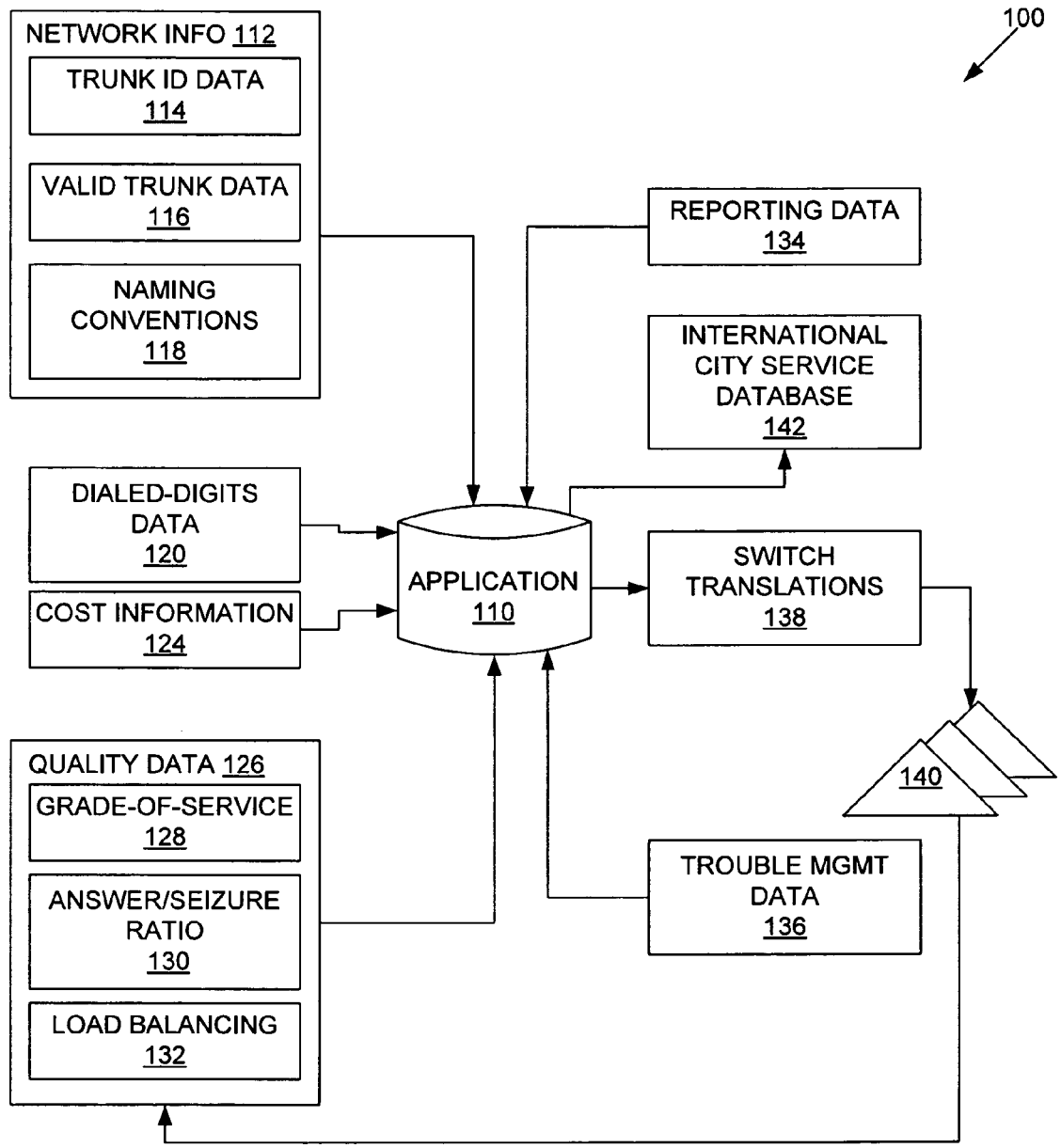
FIG. 1 is a block diagram depicting a suitable operating environment for practicing the present invention.

The present invention efficiently and accurately determines switch-update configurations to send to one or more switches that will establish a least-cost routing path for international communications.

Acronyms and Shorthand Notations

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CD ROM Compact Disc-Read Only Memory
DVD Digital Versatile Discs
EEPROM Electrically Erasable Programmable Read Only Memory
ICSD International City Service Database
IDD International Direct Dialing
IDDD International Direct Distance Dialing
LAN Local Area Network
LCR Least Cost Routing
MAN Metropolitan Area Network
MMI Machine-to-Machine Interface
PBX Private Branch Exchange
PSTN Public Switched Telecommunications/Telephone Network
RAM Random Access Memory
ROM Ready Only Memory
VoIP Voice over IP
VPN Virtual Private Network
WAN Wide Area Network Further, various telecom technical terms are used throughout this disclosure. A definition of such terms can be found in *Newton's Telecom Dictionary* by H. Newton, 18th Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above cited reference.

As one skilled in the art will appreciate, the present invention may be embodied as, among other things: a method, a data communications system, or a computer program product. Accordingly, the present invention may take the form of a hardware embodiment, a software embodiment, or an embodiment combining software and hardware. In a preferred embodiment, the present invention takes the form of a computer program product that includes computer useable instructions embodied on a computer readable medium.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, Computer-readable media comprise Computer-storage media and communications media.

Computer-storage media, or machine-readable media, include media implemented in any method or technology for storing information. Examples of stored information include computer useable instructions, data structures, program modules, and other data representations. Computer-storage media include, but are not limited to RAM, ROM, EEPROM, flash memory or other memory technology, CD ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information delivery media. By way of example but not limitation, communications media include wired media, such as a wired network or direct wired connection, and wireless media such as acoustic, infrared, radio, microwave, spread spectrum, and other wireless media technologies. Combinations of the above are included within the scope of Computer-readable media.

Least Cost Routing

As previously mentioned, the present invention is a database centered application for determining, presenting, and implementing the most economical international call routing path based on a set of inputs.

FIG. 1 illustrates an exemplary embodiment of a suitable operating environment for practicing the present invention, referenced generally by the numeral 100. System 100 enables a user to implement and communicate international switched voice routing. System 100 enables a user to manage cost of service, routing implementation processes, route-testing processes, and quality checks regarding dialed digits. In addition to routing voice, system 100 can be used to implement future technologies such as hard patch, voice over IP (VoIP) and other technologies, as one skilled in the art would appreciate.

Call routing is implemented via switch translations by application 110. In a preferred embodiment, application 110 is an ORACLE® database. Those skilled in the art will appreciate that alternative referential databases could also be used to implement application 110. In one embodiment, application 110 runs on a general-purpose computer. Those skilled in the art will appreciate that a general-purpose computer is conventional in nature and includes an operating system, input/output peripherals, storage devices, memory, and other components that cooperatively work together to run an application such as application 110.

Application 110 receives network information 112. Network information 112 includes data related to the communications networks of one or more carriers. A carrier is at least a provider of telecommunications services. Telecommunications networks are made up of switches, routers, gateways, etc., as is well known in the art. Network information 112 is processed by application 110 so that application 110 can determine available routing paths. A first set of network information 112 includes trunk identification data 114. A trunk is a communication line between two switching systems. The communication line can be either wired or nonwired. A switching system typically includes equipment in a Central Office (CO) and/or Private Branch Exchange (PBX).

The trunks of a communications network are identified using some sort of nomenclature. For example, an exemplary trunk name may be "FTW313." Alpha characters represent the type of trunk. In this example, 'F'=Foreign; 'T'=Terrestrial; 'R'=Radio; and 'W'=two way (but could be 'I'=inbound or O=outbound). The numeric values are preferably different for each unique trunk group. All valid trunks on a communications network of system 100 are identified including their associated country and carrier names. This information is received by application 110 and processed to determine potential trunks that could be used to provide a routing path. As previously mentioned, the preferred application of the present invention is in an international call routing environment. Thus, the remainder of the various examples provided herein will be applicable to an international call routing environment, however, those skilled in the art will appreciate that the teachings described herein are applicable to environments other than international call routing.

Valid trunk data 116 is also provided to application 110. Valid trunk data is data indicating which trunks of a communications network are valid and capable of communicating traffic. Packet based data could also be communicated via the present invention. Packet based data communication is used in a variety of applications such as sending data across the Internet or communicating VoIP data. Application 110 receives valid trunk data 116 to determine which of the identifying trunks are available to transmit and receive data. If a trunk becomes damaged, application 110 processes this information to reroute traffic. For example, if an earthquake or other natural event renders a trunk unavailable, the valid trunk data 116 updates application 110 that the relevant trunk is unavailable. Application 110 can be used to reroute traffic accordingly.

Naming conventions 118 are also received by application 110. Countries, carriers, and other devices may have different names and different naming conventions. These naming conventions are relayed via naming conventions data 118 to application 110.

Dialed digits data 120 is also received by application 110. Dialed digits data refer to the digits that need to be dialed to establish a communications link. Application 110 ensures that when a customer reaches a desired destination when dialing digits that are supposed to correspond to that certain country, city, province or services (i.e. mobile). Most countries have corresponding international country codes. For instance, the country code of the United States is the numeral "1." The international country code of Albania is "355." Dialed digits data 120 also include data related to country codes as well as to any international prefix or national prefix necessary to facilitate a call.

Thus, an International Direct Dialing (IDD) prefix is the international prefix needed to dial a call from a country to another country. To illustrate, the United States has a country code of "1" and an IDD prefix of "011." The country of Azerbaijan has a country code of "994." Moreover, within the country of Azerbaijan, various cities have certain city codes also. For instance, the city code for Baku is "12." Thus, to make a call from the United States to Baku, Azerbaijan, one would need to dial "011+994+12+ [the remaining number]." This dialing information is contemplated within a scope of dialed digits data 120. The trunks of a communications network must be configured such that a person making a call from the United States to Baku actually reaches Baku, when dialing "011+994+12+ . . . ." Application 110 receives the dialed digits data 120 and uses it to ensure that calls are routed to the proper countries and cities/services. Application 110 greatly aids determining a least-cost route by centralizing access to the hundreds of calling codes related to the countries and cities/services of the world. Application 110 can reference a city service directory, which contains directory codes for various cities throughout the world.

Cost information 124 is also provided to application 110. Cost information 124 includes all information related to the various costs associated with establishing a routing path. Exemplary cost information includes costs associated with making an international call from one country's landline to another country's landline. Other exemplary cost information includes costs associated with phoning a mobile or satellite customer. Calling a mobile phone overseas is typically priced differently than phoning the same recipient on a landline. Costs may also vary based on the day of the month or even the time of the day. Costs may also vary depending on the negotiated allocation agreement between two carriers. All such cost information is included within cost information 124. Other cost information that is contemplated within a scope of cost information 124 includes the costs of using an alternative carrier or a reseller.

If a first choice carrier does not have the infrastructure required or ability to complete a desired call, resources of an alternative carrier may be needed. Using this alternative carrier may affect the price establishing an international communications link. This information is received by application 110 in making a determination of the least-cost, international-routing path. Those skilled in the art will appreciate additional costs associated with establishing an international-routing path, and those too are contemplated within the scope of the invention.

Quality data 126 is also provided. Quality data is received and a determination is made as to whether changes to international call routing paths need to be made. One aspect of quality data 126 includes grade-of-service 128.

The grade-of-service components(s) 128 include data that relates to a specific grade-of-service for a communications line. Grade-of-service data 128 can be used to estimate customer satisfaction with a certain aspect of service in light of potential problems such as echoing, blocking, noisiness, connecting rate, etc. For example, if the noise grade-of-service is 85 percent for a specified distribution of noise, that means that 85 percent of the customers assess the service to be acceptable. Various grade-of-service measures can apply to all aspects of telecommunications networks. In some situations, grade-of-service equates only with the probability of a call being blocked. Generally though, grade-of-service relates to the blocking probability. If a grade-of-service 128 drops below a threshold level, application 110 can present this data to make available additional trunks or additional routing means to increase the grade-of-service.

Another type of quality data 126 is answer/seizure ratio data 130. The answer/seizure ratio is the ratio of answers to seizures of circuits and measures the effectiveness of a telecommunications service offering. The answer/seizure ratio 130 relates the number of line seizures with the number of answered or completed calls. The more destination devices that are available, the higher the answer/seizure ratio. The present invention can accept various answer/seizure ratio values based on the type of service offered. For instance, the application may be programmed not to take corrective measures until various answer/seizure ratios are reached for various types of services. For example, an answer/seizure ratio may differ based on whether the line is a direct sale, a resale, a transit/hub, or a mobile customer. The application processes answer/seizure ratios based on the type of service offered and can implement corrective measures when an answer/seizure ratio dips below a prescribed value. The answer/seizure ratio refers to the percentage of calls placed that actually complete to a terminating end. For instance, an answer/seizure ratio of 15 percent for India means that approximately 15 percent of calls being made from a certain place are reaching India and terminating properly. Typically, the answer/seizure ratio 130 is higher for calls made from countries with more robust telecommunications infrastructure. Accordingly, if the answer/seizure ratio 130 drops below a threshold level, the application can make changes to increase the answer/seizure ratio 130. By increasing the answer/seizure ratio, a greater percentage of calls placed will actually reach and terminate at their desired destination.

Load balancing data 132 is also received as part of quality data 126. Load balancing refers to the practice of splitting communication into multiple switches. Communication is made faster and more reliable by balancing traffic on each switch. Changing switch(es) and inner machine trunk terminations can balance traffic on a telecommunications network. Accordingly, if a carrier observes that a disproportionate amount of traffic is being communicated between two locations, a greater allocation of resources can be dedicated to that communication, increasing its reliability and speed. The load balancing data 132 is communicated to application 110 so that application 110 can make a determination as to the most applicable routes to communicate international traffic based on the current load balancing statistics.

Another form of quality data 126 includes allocation data. Allocation data allows information for each carrier and the agreed to percentage of traffic negotiated for each route. The data is provided to help determine if the traffic is truly completing to the agreed to destination and commitments for each carrier are being met. Corrective measures can be implemented if necessary.

Reporting data 134 allows application 110 to provide reports to users that can be used to communicate statuses of the network. One exemplary report includes a rank report. A rank report shows the routing alternatives ranked by cost and qualified by status. This report preferably includes country/carrier specific gateways. Another exemplary report could be a switch/rank report. A switch/rank report depicts the routing alternatives for each international switch, ranked by cost point and qualified by status. This report can include country/carrier specific gateways, as well as an allocation and monthly equivalent traffic information. Other reports can be sourced by reporting data that provide cost routing information used by Carrier Services to understand the cost and route alternatives available to a carrier in determining international switched voice traffic as well as other data traffic.

In a preferred embodiment, reports are available via a Web interface and provide the user with an option to download the reports in a spreadsheet type format. Those skilled in the art will appreciate alternative formats that lend themselves to intuitive data assimilation. Reports based on organization process intervals and route transaction volumes by product can be generated using reporting data 134. Route transaction workflow can be measured via time intervals and volumes by product type, country, days, weeks, months or even years. Measurements can be in normal or business hours. Reporting data can also include workflow information related to routes from application 110.

Reporting data 134 can also be used to gather data on a periodic basis from financial groups representing revenues generated by carrier and destination countries associated with various routing scenarios. Reporting data 134 can also include data necessary to determine routing transaction volumes generated by carrier and destination countries associated with various routing scenarios and/or corresponding hours to route.

Graphical data depictions can also be produced by application 110 using reporting data 134. An exemplary graphical depiction could include a graph showing the top ten revenue producers. Those skilled in the art will appreciate additional graphical depictions that could be generated from reporting data 134 or any inputted data received by application 110.

Trouble management data 136 is also received by application 110. Trouble management data 136 includes data relating to various problems that occur throughout a communications network. Routers go offline, trunks become disrupted, gateways become overburdened, and other problems can occur throughout a network. When such trouble is sensed, data can be included into application 110, which can then present or take corrective action and reallocate routes based on the valid trunk data 116 or any other data inputted into application 110. Trouble management data 136 can also include prescribed measures to take when various troubles occur on a telecommunications network. Thus, the trouble management data 136 can itself be used to solve various problems that occur in the day-to-day operation of communicating international dated traffic.

The various data described above is provided to application 110, which then presents switch update information or produces an output stream in the form of switch translations 138.

A switch is a conventional communications network device that is a mechanical, electrical or electronic device that opens or closes circuits, completes or breaks an electrical path, or selects paths or circuits. Switches come in a variety of flavors such as data switches, voice switches, and routers, which are intelligent data switches. "Switch translations" refers to the interpretation by a switching system of all or part of a destination code, which determines the routing of a call. The switch translations 138 include information used to program one or more switches 140 that implement an international call routing path.

In one embodiment of the present invention, application 110 receives the various data inputted and described above and presents in a logical manner the information necessary for a switch translations analyst to program a switch. In another embodiment, application 110 actually provides the switch translations 138 and reconfigures the one or more switches 140 needed to implement a desired international-routing path in the most economical manner. The switches 140 can then provide information back to the quality data 126, which can be injected into and received by application 110 to further affect the resourcefulness of a telecommunications network. Thus, where the prior-arts systems include only fragments of data that could possibly be used to help determine a least-cost routing path, the present invention receives all data necessary from all sources necessary to automatically construct and determine a least-cost routing path and either presents that information on a graphical user interface to a communicatively coupled display device or actually creates a switch update transaction that is communicated for one or more switches 140 necessary to implement the least-cost routing path.

A skilled artisan can glean various functional aspects of application 110 by providing one or more screen shots of the user interface presented by application 110. Accordingly, FIGS. 2-6 are selected representative screen shots indicating certain functional aspects of the present invention.

Figure 2:
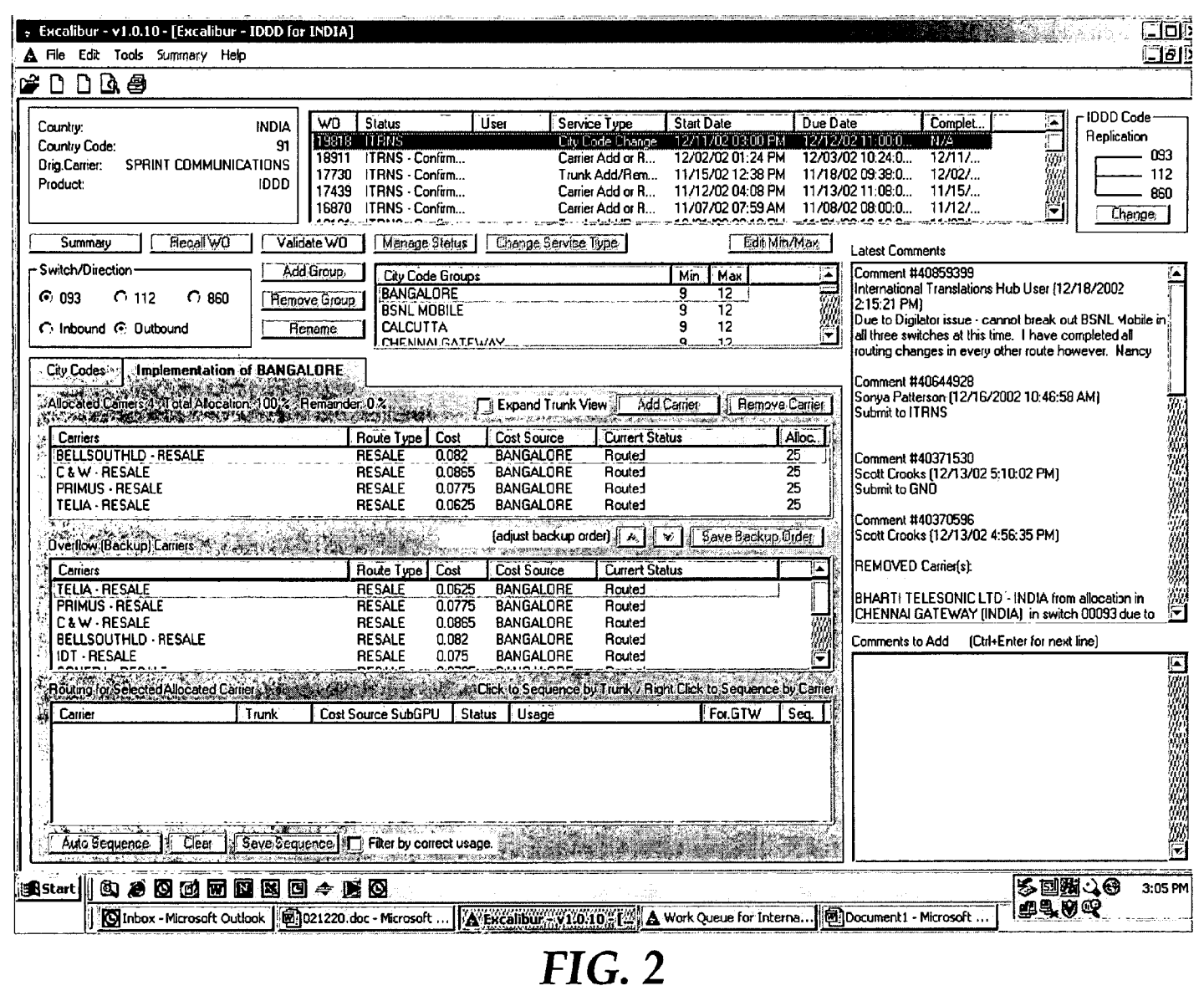

FIG. 2 is a screen shot illustrating an International Direct Distance Dial (IDDD) for India. The screen shot of FIG. 2 is intended to be merely illustrative and should not be construed to limit the present invention. Providing the screen shot of FIG. 2 allows a greater elaboration of the functionality offered by application 110.

In an upper left pane of FIG. 2, the country is identified along with its country code ("91" for India), the originating carrier, and the product. In this example, the originating carrier is the SPRINT COMMUNICATIONS COMPANY (SPRINT). The product is "IDDD", see FIG. 2. Other products such as data products, hard patch or Virtual Private Network (VPN) products can also be presented. In another pane of the user interface illustrated in FIG. 2, a scrollable sheet indicates various work orders. This sheet can show information related to a work order, its status, applicable users, service type, start date, due date, and the date that the work order was completed. As shown, work order "19818" is highlighted. The most current Work order "19818" is in an "international translations" status where the type of service includes a city code change. Work order "19818" was started on Dec. 11, 2002, at 3:00 p.m. and is calculated to be completed the following day by 11:00. This screen also allows the ability to select allocated carriers and overflow carriers along with a cost associated with each. All comments are provided for each work order with a scroll down functionality.

Another scrollable screen area provides information related to city code groups and the minimum and maximum number of dialed digits, which are a subset of dialed digits data 120. For the example depicted in FIG. 2, calling Bangalore requires at least nine but no more than twelve digits be dialed or the call will not be completed. Accordingly, system 100 would create a translations request to implement those instructions in the switch to reach Bangalore, India. Two tabs are shown in FIG. 2.

The first tab is a city codes tab, which is not shown in detail. The city codes tab lists the various international city codes associated with a particular country. Some countries can have tens or even hundreds of city codes. Those city codes are easily observed and presented to a user under this tab. Each set of city codes can be designated by a specific group name, for instance, in this example; you can see Bangalore, BSNL Mobile, and Calcutta.

Another tab is an implementation tab, which is entitled "Implementation of Bangalore". The data reflected in the implementation tab is related to the selection made at the top of the screen. Work order "19818" is the selection at the top of the screen. From the implementation tab, it can be seen that BELL SOUTH is a reseller of 25 percent of the routed traffic in this scenario. This means that SPRINT has allocated that 25 percent of the traffic through this communications channel should be allocated to BELL SOUTH, which is a reseller in this example. C&W, see FIG. 2, is also a reseller, and it is configured to receive a 25 percent allocation as well. PRIMUS and TELIA are two additional resellers that each receives a 25 percent allocation of data traffic. A user is also able to define overflow backup carriers, as shown for reseller Bell South, Telia is the first backup carrier, then Primus, C&W, see FIG. 2, etcetera.

A "comments" section is also provided in a screen shot of FIG. 2. The "comments" section is automatically populated and tracks the changes that a user makes with information such as time, date, and name. Additional comments can be added in a dedicated screen area, below the "comments" section.

One skilled in the art could observe the various buttons and controls presented on the screen shot of FIG. 2 to determine additional functionality not described in greater detail herein but contemplated within the scope of the present invention.

FIG. 3 is a screen shot of configuration details for an active work order, which is illustratively shown for work order "19818" of FIG. 2. As previously described in one embodiment, application 110 can present to a user all the information necessary to implement a switch update that configures a desired routing path to be set up. The screen shot of FIG. 3 has two panes: a left pane and a right pane. The left pane is entitled "Configuration Details for Active Work Order," while the right pane is entitled "Summary of Changes for Active Work Order." The right pane summarizes the changes that need to be implemented in a switch for an active work order. This summary greatly simplifies the work that a switch translations analyst must do in order to update a switch and is a novel aspect of the present invention.

In a limited space shown toward the bottom of the "Summary of Changes" pane are enumerated commands that a switch translations analyst is to follow in order to update one or more switches. As can be seen from this example, there are no minimum/maximum values to change. Similarly, there are no city codes to be added. If one were to scroll down through the list of changes, a switch translations analyst would simply need to read what changes need to be made and implement them in this embodiment. This is a great improvement over an analyst having to determine what changes need to be made based on the various data inputs from various sources not centralized, as they are in FIG. 1.

Moreover, a representation of how the logical data values in the switch should appear is presented in the "Configuration Details for Active Work Order" pane of FIG. 3. This "Configuration Details" pane illustrates what the configuration should actually look like in the respective switch. As shown, the first set of city codes should be "80" only. The minimum/maximum digits correspond to "9/12." The outbound allocations are consistent with those of FIG. 2. That is, the percentage of amount of traffic is shown to a switch translations analyst in the configuration details pane. Here, "C&W-RE-SALE" is to receive 25% of the amount of traffic for this trunk. Similarly, "BELL SOUTH" is to receive 25%, "PRIMUS" is to receive 25% and finally "TELIA" is to receive 25% of the allocated traffic. Routing details, as well as the other details shown in FIG. 2, are provided in the configuration pane of FIG. 3. The corresponding backups with the respective trunk IDs are also provided. Using the "Configuration Details" screen in conjunction with the "Summary of Changes" screen enables a switch translations analyst to determine what changes need to be made and provides a benchmark representation of how the configurations within one or more switch(s) 140 should appear. This sort of comparison and testing platform greatly reduces the likelihood of errors propagating through a communications network. In one embodiment, this information is processed and application 110 provides a switch update command to the switch(s) necessary to implement the Least Cost Routing (LCR) path.

Figure 4:
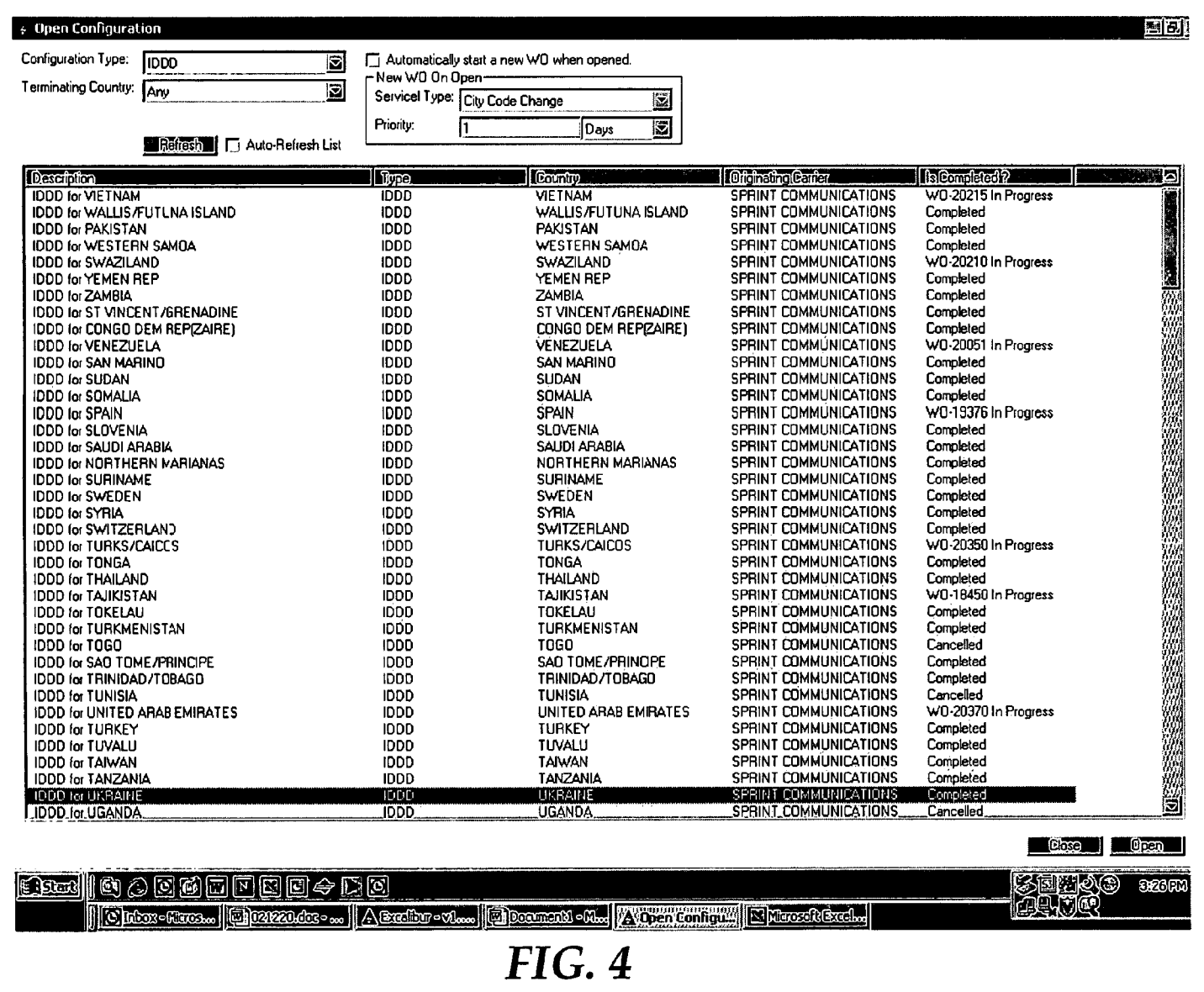

FIG. 4 demonstrates that application 110 can provide to a user a summary sheet indicating open configurations and their current statuses. From FIG. 4 it can be seen that a description, type, country, originating carrier, and completion status can be depicted in a single screen. Search criteria can be entered at the top of the screen.

Figure 5:
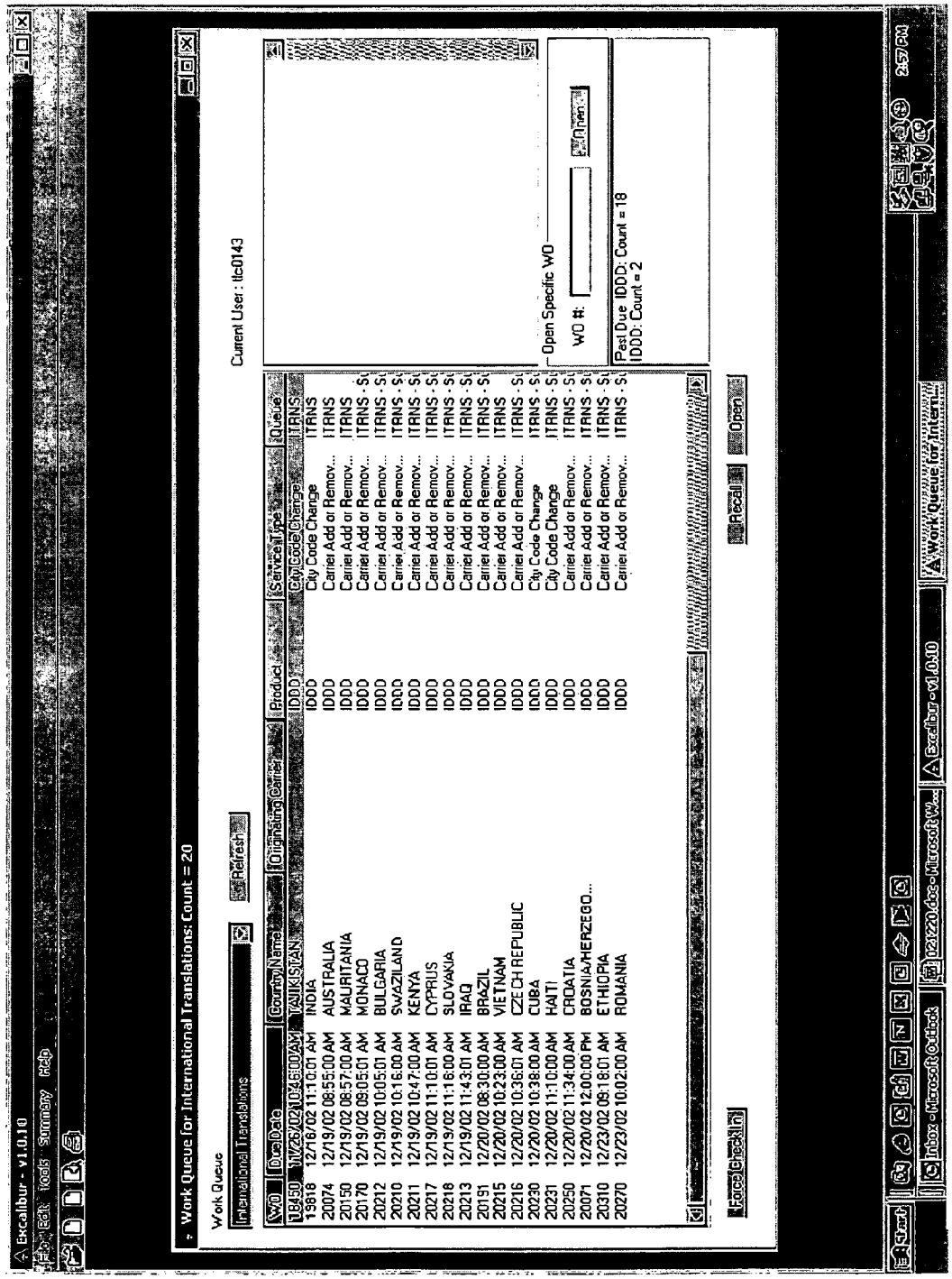
FIG. 5 is a fourth screen shot of the present invention depicting a fourth exemplary function of the present invention: presenting a work queue that is specific to one or more entities based on user logon and/or associated department or manual selections.

FIG. 5 is a screen shot of a work queue. From this screen users can determine what needs to be completed on a day-to-day basis. For instance, the work orders shown in FIG. 5 correspond to the work orders related to international translations, which for illustrative purposes, will be handled by an International Translations Department. FIG. 5 illustrates that there are twenty work orders to be completed. These work orders can be sorted by clicking on the various column headings, such as "work order," "due date," "country name," "originating carrier," "product," "service type," or "queue." The user can also access work orders for other departments by selecting them from the drop down menu and then pressing the "refresh" button. In a preferred embodiment, the work orders presented in this work order queue are based on and filtered consistent with a specific person who logs in to the system 100. The screen shot of FIG. 5 illustrates that a person working in the International Translations Department, "ITRNS," has logged onto the system. Accordingly, the work orders shown are those that correspond to the International Translations Department.

Figure 6:
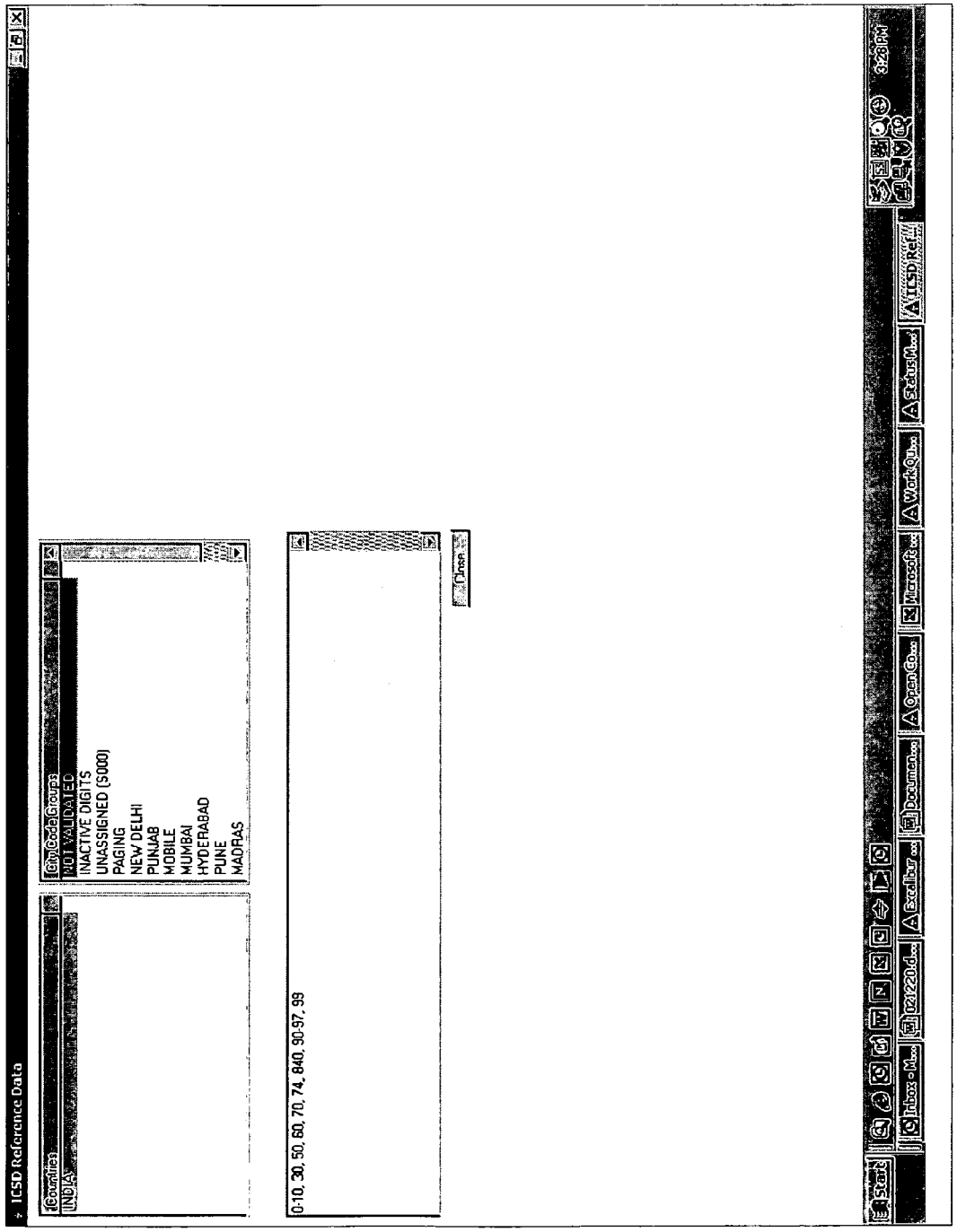
FIG. 6 is a fifth screen shot of the present invention depicting a fifth exemplary function of the present invention: referencing city groups and their associated dial plans to the International City Service Database.

FIG. 6 shows a screen shot of various reference data relating to international city services database. This screen illustrates a functional aspect of application 110, whereby a user can associate various city codes with various cities. This is useful because not all databases accurately reflect cities and their corresponding city codes. The screen shot of FIG. 6 demonstrates how a user can observe or enter city codes that correspond to various cities. Thus when the user is presented with an opportunity or offer to purchase minutes from a certain provider, the user will have a better idea of how to allocate resources and determine a price for those minutes. Because the right pane includes various city code groups, such as paging, New Deli, mobile, etc., a user can click on a specific category and get the city codes associated with that selection. For instance, a user could select mobile and determine the entire different city codes associated with mobile phone numbers that ring to India.

Figure 7:
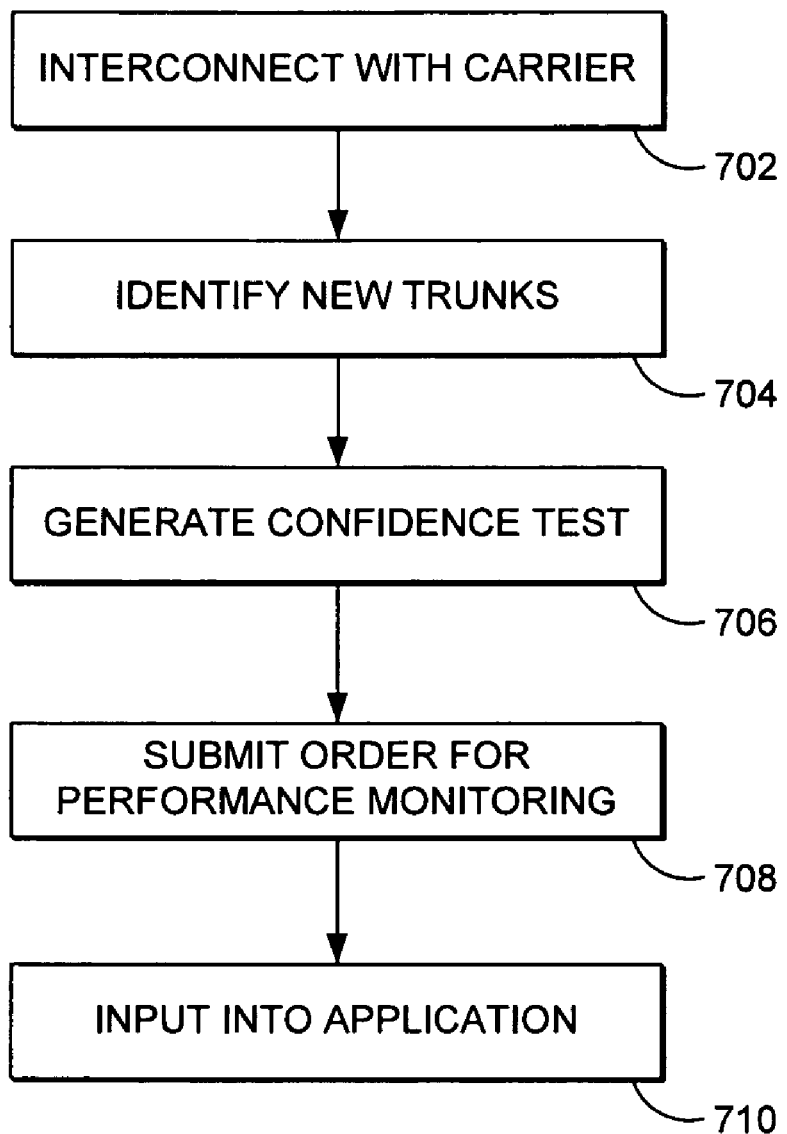
FIG. 7 is a flow diagram depicting an exemplary method for conducting confidence testing for newly built carrier trunk groups.

The present invention also allows new circuits and current circuits to be tested before being deployed. Testing trunk groups before they are actually placed into service reduces the likelihood that problems will occur during user operation. FIG. 7 illustrates an exemplary process for carrying out confidence testing. Confidence testing is testing that ensures that the circuits actually work. At a step 702, interconnection is made with a carrier. This interconnection can be an establishment and identification of a carrier code and an agreement to bring up service to specific countries.

After the trunk is interconnected with the carrier, it is identified at a step 704. New trunks are identified for application 110 to reference in the future. Confidence test is generated at a step 706. Those skilled in the art will appreciate that a confidence test can assume a variety of formats and test a variety of features. The confidence test can test the integrity of the line, throughput of the line, bandwidth of the line or other variables, as would be understood by a skilled artisan. At a step 708, an order is submitted for performance monitoring. It is during this step that a confidence test administered in step 706 is observed to determine the integrity of the new trunk group; usually routing selected traffic at a small percentage. At a step 710, the results from the confidence test are inputted into application 110. With the data in application 110, corrective measures can be implemented to remedy problems surfaced and determined during confidence testing.

Figure 8:
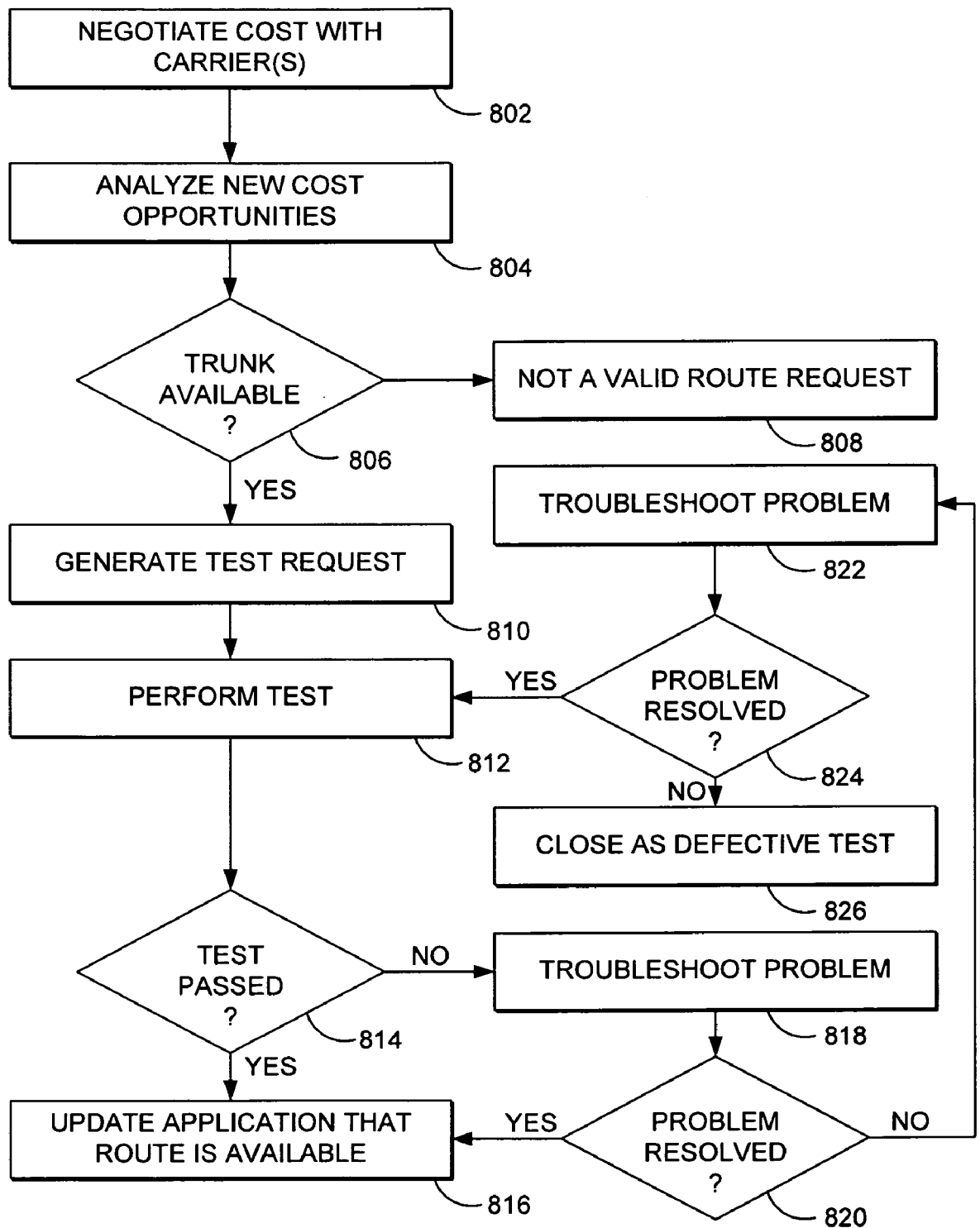
FIG. 8 is a flow diagram depicting an exemplary method for proactively conducting routing testing prior to route implementation.

FIG. 8 represents an illustrative process for conducting route testing. Route testing is a process to determine whether a trunk works for a specific country or city. At step 802, cost negotiation is conducted with various carriers. The new costs are analyzed for potential opportunities at a step 804. At a step 806, a determination is made as to whether a specific trunk is available. If a trunk is unavailable, then a note is made that the trunk represents an invalid route request at a step 808. If the trunk is available, then the test requested is generated at a step 810. This test request can include a request for a variety of tests, such as a transmission quality test, communications test, etc. Those skilled in the art will appreciate the litany of tests that can be generated. The test that was decided at step 810 is performed at a step 812. A determination is made at step a 814 as to whether the trunk passed the test. If so, application 110 is updated that the route is available at a step 816. If the test did not pass, troubleshooting begins at a step 818.

Troubleshooting can involve isolating the source of the problem that is causing the performance degradation in the respective trunk route. Next a determination is made as to whether the troubleshooting resolved the problem at a step 820. If so, the application 110 is updated that the trunk is now available at a step 816. If the problem was not solved at a step 820, then the problem is again troubleshot at a step 822. After troubleshooting occurs, another determination is made as to whether the troubleshooting in step 822 solved the problem. If the determination made at a step 824 is "yes," that the problem was resolved, then flow continues to step 812 where the test is reperformed on the trunk. If, however the problem was not solved through troubleshooting at step 822, then the test is "closed as a defective test" at a step 826.

As can be seen, the present invention and its equivalents are well adapted to provide a new and useful method for efficiently determining a least-cost routing path to communicate international traffic. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. Computer-storage media having computer-executable instructions embodied thereon that, when executed, cause a computing device to perform a method for conducting route testing, comprising:
   at the computing device, receiving a request to test routes and trunks;
   identifying carrier costs for the requested routes;
   processing the carrier costs to identify alternate routes for the requested routes;
   checking the requested routes and alternate routes to locate the requested trunks; and
   testing the requested trunks when the trunks are located.

2. The media of claim 1, wherein the tested routes are available if the located trunks pass the test.

3. The media of claim 1, wherein the tested routes are unavailable if the requested trunks are not located.

4. The media of claim 1, wherein the test comprises transmission quality tests and communication tests.

5. The media of claim 1, wherein troubleshooting occurs if the located trunks fail the test.

6. Computer-storage media having computer-executable instructions embodied thereon that, when executed, cause a computing device to perform a method for conducting route testing, the method comprising:
   receiving a request to test routes and trunks;
   identifying carrier costs for the requested routes;
   processing the carrier costs to identify alternate routes for the requested routes;
   checking the requested routes and alternate routes to locate the requested trunks; and
   testing the requested trunks when the trunks are located.

7. The media of claim 6, wherein the tested routes are available if the located trunks pass the test.

8. The media of claim 6, wherein the tested routes are unavailable if the requested trunks are not located.

9. The media of claim 6, wherein the test comprises transmission quality tests and communication tests.

10. The media of claim 6, wherein troubleshooting occurs if the located trunks fail the test.

11. One or more computer-storage media storing instructions that cause one or more processors to perform a method to conduct route testing, the method comprising:
   receiving a request to test routes and trunks;
   identifying carrier costs for the requested routes;
   by way of the one or more processors, processing the carrier costs to identify alternate routes for the requested routes;
   checking the requested routes and alternate routes to locate the requested trunks; and
   testing the requested trunks when the trunks are located.

12. The method media of claim 11, wherein the tested routes are available if the located trunks pass the test.

13. The method media of claim 11, wherein the tested routes are unavailable if the requested trunks are not located.

14. The method media of claim 11, wherein the test comprises transmission quality tests and communication tests.

15. The method media of claim 11, wherein troubleshooting occurs if the located trunks fail the test.

* * * * *